United States Patent  [15] 3,704,647
Painaud  [45] Dec. 5, 1972

[54] SEAL
[72] Inventor: Jean Painaud, Ville de Laval, Quebec, Canada
[73] Assignee: Tritton Enterprises Ltd., Montreal, Quebec, Canada
[22] Filed: May 20, 1970
[21] Appl. No.: 39,123

[52] U.S. Cl. ................................................. 85/55
[51] Int. Cl. .......................... A47g 3/00, F16b 15/02
[58] Field of Search .......... 85/53, 55, 35, 1 JP, 9, 28; 10/161; 292/307; 277/166, 178

[56] References Cited

UNITED STATES PATENTS

| | | | |
|---|---|---|---|
| 1,759,917 | 5/1930 | Ross | 85/55 |
| 1,818,651 | 8/1931 | Ross | 85/55 |
| 1,061,176 | 5/1913 | Hart | 85/53 |
| 1,048,902 | 12/1912 | Simons | 85/53 UX |
| 1,315,832 | 9/1919 | Hardinge | 85/53 UX |
| 1,818,650 | 8/1931 | Ross | 85/55 |

Primary Examiner—Ramon S. Britts
Attorney—Stanley D. Schwartz

[57] ABSTRACT

A seal device for sealing the heads of screws, bolts or the like against tampering. The seal device has a cap portion with a cavity, a peripheral flange and a depending deformable skirt. It is preferably of a one-piece construction made of material such as steel or tin, and is adapted to be used with screws, bolts or the like which have an inwardly stepped shoulder at the base of the head to receive the deformed skirt of the seal device. The invention also provides a method of sealing screws or the like using the above type of seal.

7 Claims, 7 Drawing Figures

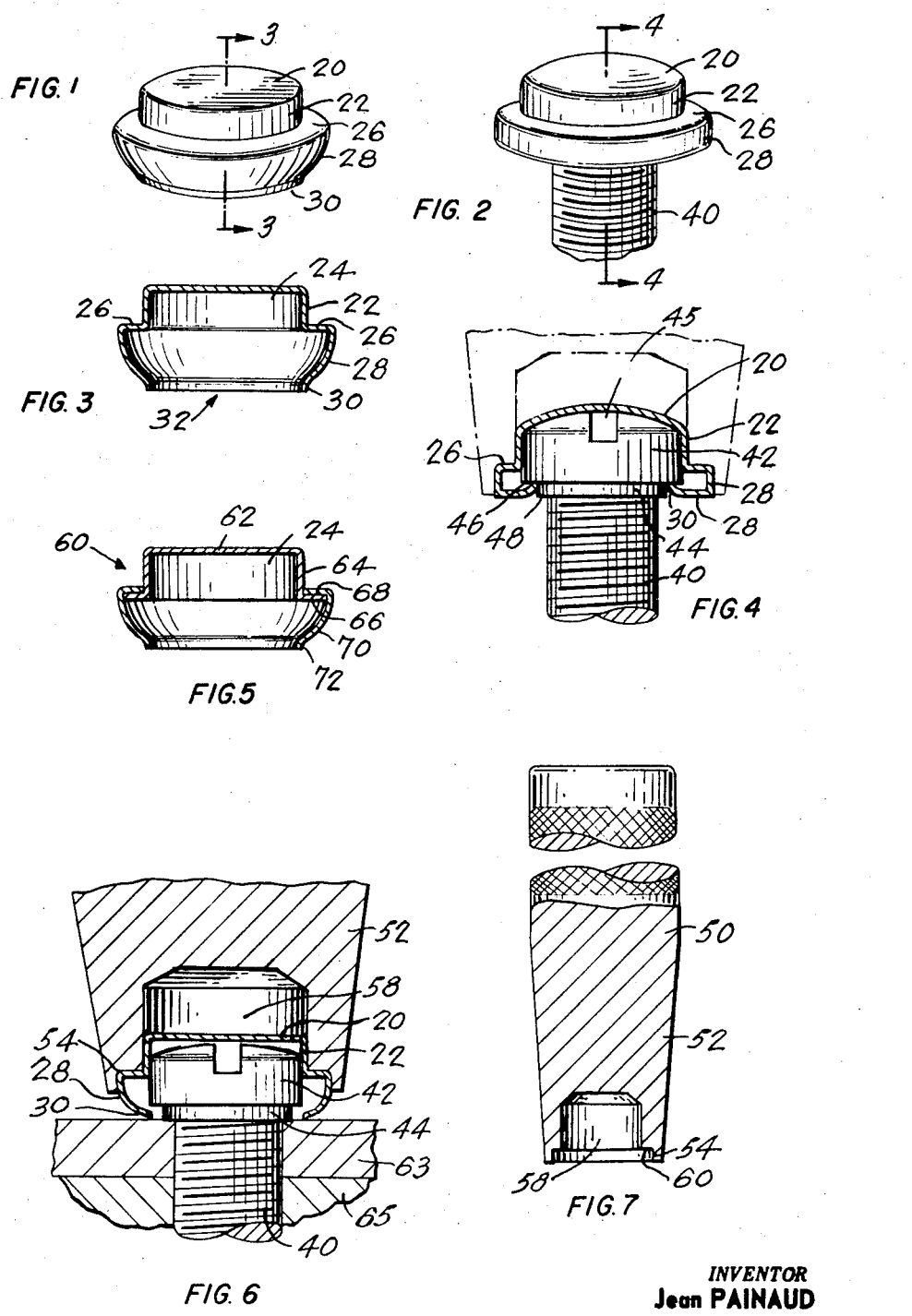

SEAL

This invention relates to tamper-proof seals for connecting means such as screws, bolts, rivets or the like for joining two or more members or objects together.

More particularly, one aspect of this invention relates to a novel tamper-proof seal device for sealing connecting means — e.g. screws, bolts, rivets or the like against tampering, without visible destruction or indication of tampering on the seal; and in another aspect to a method of sealing such connecting means against tampering.

There are a large number of different types of seal constructions well known in the art for different areas of application, such seal devices being employed where there is a requirement to prevent tampering with an object or device, or conversely to indicate that an object or device has been tampered with by virtue of damage or destruction of the seal device. The type of seal device to which the present invention particularly applies relates to devices which function to prevent tampering with connecting means, i.e., screws, bolts, rivets, etc. used to join or connect two or more members together, by preventing access to the connecting device to prevent the same from being removed or disconnected, without visible destruction or damage to the seal device. Typical of the uses of such seals are to prevent access to connecting means used to join two or more components as for example in hydro or other meter devices, plaque assemblies such as license plates, etc. In these cases, screws or bolts, or even rivets, are used to maintain two or more components of the device or object assembled and with the seal devices of the present invention such seals are adapted to prevent access to the connecting means.

In the prior art pertaining to this type of seal, various proposals have been made to provide tamper-proof sealing units — for example as shown in U.S. Pat. Nos. 2,146,697 to H. F. George issued on Feb. 7, 1939, 2,178,727 to H. K. Owens issued on Nov. 7, 1939, 3,034,386 to W. D. Corlett et al. issued on May 15, 1962, 3,134,290 to A. P. Jentoft issued on May 26, 1964, 3,174,383 to F. Heil issued on March 23, 1965, etc. The seal devices of these references, while generally effective within their own right, have the disadvantage of requiring relatively expensive modifications to the connecting means to permit adaptation of the seals, and in addition, the seals per se are of a relatively complicated structure requiring relatively expensive manufacturing steps and costs.

Notwithstanding the number of different proposals made in the art for such sealing devices, there is still a need for a relatively simple, uncomplicated and effective seal device which will effectively seal a connecting means such as a screw, bolt or rivet against tampering without visible destruction or damage to the seal, and which can be used with relatively few modifications to the connecting means.

In accordance with this invention, there is provided a novel seal device which overcomes the disadvantages of the prior art seals. More particularly, the present invention provides in one aspect, a nonresilient seal device for use with connecting means such as screws, bolts, rivets, etc., which device includes a cap provided with a cavity therein, an outwardly extending peripheral flange surrounding said cap, and a peripherally deformable downwardly depending skirt connected to the flange, the skirt having a terminal neck portion defining therebetween an access opening to the cavity of the cap.

The above seal device of the present invention is adapted to be employed with a connecting means which includes a shank portion and a head portion connected thereto, which head portion normally forms or is provided with the means by which the connecting device is capable of being inserted and/or removed. For use with the present invention, the head of the connecting device is provided with an inwardly stepped peripherally extending shoulder at least partially surrounding the base of the head and being adapted to receive in sealing engagement therewith a deformed skirt portion of the seal device when the latter is applied onto the connecting device, whereby the base of the head of the connecting device, when assembled in use for the purpose of connecting two or more members of an object or device together, lies in juxtaposition with the surface of one of the members to prevent access to the depending skirt.

The cap portion of the seal device functions to prevent access to the head of the connecting means, and hence prevent removal of the connecting means once the seal device is installed. The cap is most desirably a closed one-piece body of a continuous one-piece wall defining therebetween a cavity, which cavity is adapted to surround and encompass the head or top portion of the connecting means, e.g. a screw, bolt, rivet or the like, and to prevent access thereto and hence removal of the connecting device from connecting engagement with two or more members joined together. The cap may be of any suitable shape and size, a preferred form being an overall deformable cylindrically shaped body capable of being deformed into juxtaposition with the shape of the head of the screw, bolt or the like connecting means. To this end, the cap preferably is of deformable nonresilient material capable of being deformed upon application to the connecting means into juxtaposition with or assuming the contour of the head of the screw or bolt.

If desired, the cap may have a body consisting of a plurality of interconnected strips adapted to surround the head of a bolt, screw or the like in place of a continuous one-piece wall, with the strips being spaced-apart or located in such a manner so as to prevent access to the head of the bolt or screw. Such an arrangement is useful in the case of, for example, where large screw, bolt or rivet heads are employed.

The exact configuration or shape of the cap will vary depending on the configuration of the head of the bolt or screw to which it is to be applied; in the case of circularly shaped screw or bolt heads, the cap is likewise preferably of a circular shape; in the case of rectangularly or polygonally shaped screw or bolt heads, the cap preferably has a corresponding shape. The size of the cavity within the cap should in all cases be sufficient to completely encompass and enclose the screw or bolt head, either upon application of the cap to the head of the connecting device or upon deformation of the cap to conform to the contours of the head of the connecting means, and to this end, the depth of the cavity will vary depending on the particular size of the screw, bolt or rivet head.

The outwardly extending flange surrounding the cap functions to permit pressure to be applied to the depending skirt to deform the latter into sealing engagement with the inwardly stepped shoulder of the connecting means, as hereinafter described in greater detail. Preferably the flange is substantially continuous about the periphery of the cap, and desirably is at substantially right angles thereto. The flange forms with the cap a stepped shoulder, adapted to be located about the periphery of the head of the screw or bolt. To this end, the flange is preferably integrally connected to the cap.

Connected to the flange is a peripherally deformable skirt, having a terminal neck portion forming an access opening in communication with the cavity of the cap, to permit the screw or bolt head to be placed into the cavity in the cap. The skirt portion is of a nonresilient deformable nature which, once the screw or bolt head has been placed into the cavity, is adapted to be deformed into sealing engagement with the inwardly stepped shoulder of the connecting means, and prevent access to the connecting means once the latter is in connecting engagement on a device or object. According to a preferred embodiment, the downwardly depending skirt inwardly tapers to form a terminal neck portion having a restricted opening, and the skirt is preferably a one-piece continuous wall connected to the peripheral flange; however, if desired, the skirt may be formed of a plurality of depending strips or lengths of material connected to the flange, and surrounding the flange to define therebetween an opening in communication with the cavity of the cap.

The length of the skirt will vary depending on the size of the connecting device; it will be sufficient, however, to engage the stepped shoulder of the connecting device, and to prevent access to the connecting device so that the latter may not be removed from engagement with a member or object without destruction or damage to the seal.

In a modified form of the seal device, the terminal neck portion of the skirt may terminate in a substantially straight peripheral flange extending in an axis generally parallel to the axis of the seal. This straight neck portion is desirable for providing a bearing surface for the seal, against which the pressure is transmitted to from the flange, when the seal is placed on a connecting device to seal it in place.

In an alternate form of the seal device of the present invention, the seal may be made of two parts for certain applications, in which the above-described cap portion is provided with a peripherally extending mating flange adapted to mate with the interior surface of the outwardly extending peripheral flange of the seal. In this embodiment, the outwardly extending mating flange connected to the cap is preferably substantially coextensive with the peripheral flange of the seal to provide positive locking.

The seal device of the present invention may be made from any deformable nonresilient material, such materials being for example various types of metals, e.g. aluminum, steel, tin, etc. The choice of material is not critical, but must be of a nonresilient deformable type to obtain the advantages of the present invention. The thickness of the material from which the seal device is made may vary considerably, it again depending on the application, and the material from which it is made. The thickness should be sufficient to impart to the seal the desired strength characteristics and in the case of metals, may vary from about two- to thirty-thousandths of an inch.

The seal device of the present invention may be manufactured by any suitable method including, for example, cold deforming of a sheet metal blank, casting of metals into the desired shape, etc.

The connecting means with which the seal of the present invention is adapted to be employed may be provided with a conventional head portion, typically a structure providing a cooperating engaging surface adapted to mate with a cooperating surface of an apparatus to permit the connecting device to be removed. Thus, for example, in the case of a screw, this may include one or more slots of various configurations adapted to mate with, e.g. a screw driver; in the case of a bolt, this may include a rectangularly or polygonally shaped head adapted to mate with a wrench.

The head of the connecting means is specifically provided with an inwardly stepped peripherally extending shoulder at the base thereof, which shoulder forms a bearing surface against which the deformable skirt of the sealing device may be placed in juxtaposition. To this end, the bearing surface preferably comprises a substantially flat border about the periphery of the base of the head of the connecting means, and which is preferably about the periphery of the head. The depth of the bearing surface may vary, and may extend inwardly from about 1/32nd of an inch to one-fourth of an inch or more, depending on the size of the connecting means.

The use of a bearing surface of the above-described type permits the connecting means to be inserted flush with the surface of the member or members, to which it is applied, whereby access to the deformed skirt of the sealing means is prevented when the skirt is deformed into juxtaposition with the bearing surface and when the connecting means is mounted flush with a surface.

The shank of the connecting means may be of any suitable conventional structure, which depends on the manner in which it is intended to be used. Thus, for example, the shank may be partially or totally threaded as in the case of a screw or bolt or nonthreaded as in the case of a rivet.

In use, the seal device of the present invention is applied to the head of the connecting device, normally after the latter has been mounted in connecting engagement with one or more members to which it is intended to be applied to. Thereafter, once the connecting member is mounted in connecting engagement with the base of the head being in juxtaposition or being flush with the surface of the object, downward pressure is exerted on the flange which deforms the skirt when the latter abuts, for example, a surface of an object, into juxtaposition with the inwardly stepped shoulder of the connecting device, thereby effectively sealing the connecting member against tampering without destruction or damage to the seal.

The seal of the present invention has many advantageous features over prior art seals, some of which are; the seal is very easy to apply to connecting devices such as screws, bolts, rivets and the like, and may be applied in a one-step operation following placing or mounting of the connecting means. The seal device is also readily manufactured, and renders a connecting means tamperproof, or if tampered with, readily indicates tampering by damage or destruction of the seal. Additionally, the seal device of the present invention is used with connecting means which may be readily modified as compared to the type of connecting means previously required for use with many of the prior art seal devices. Moreover, the seal device of the present invention can be manufactured in a plurality of sizes without changing the structure of the device and may be readily adapted to conform to the contours of the connecting means without extensive modifications as, for example, may have been required with the prior art seal devices.

Having thus generally described the invention reference will now be made to the accompanying drawings illustrating preferred embodiments and in which FIG. 1 is a perspective view of a seal device of the present invention prior to being mounted on the head of a connecting device (e.g. a screw);

FIG. 2 is a view showing the seal device of the present invention applied to a connecting device;

FIG. 3 is a section taken along the line 3—3 of FIG. 1;

FIG. 4 is a section taken along the line 4—4 of FIG. 2;

FIG. 5 is a vertical section through a modified seal device of the present invention;

FIG. 6 illustrates the manner in which the seal device is secured about the head of a connecting device; and FIG. 7 is a vertical section through a tool suitable for applying the seal device to a connecting means.

Referring initially to FIG. 1, there is illustrated a seal device of the present invention prior to being applied to a connecting device. The seal includes a top cap portion having a flat wall 20 with a continuous side wall 22 connected thereto and defining therebetween a cavity indicated generally by reference numeral 24 adapted to receive the head of a connecting device. The cap of the seal in this embodiment is of a generally cylindrical nature to accommodate the cylindrically shaped head of the connecting member, the depth of the side wall 22 being slightly less than the height of the head of the connecting member for reasons hereinafter described. Connected to the wall 22 is a continuous peripheral flange indicated by reference numeral 26 extending outwardly from wall 22 at substantially right angles thereto.

Connected to the flange 26 is a downwardly and inwardly extending, curved peripheral skirt 28, terminating in a straight neck portion 30. The neck portion 30 outlines an access opening generally indicated by reference numeral 32 adapted to permit the passage of the head of the connecting member into the cavity 24 of the seal.

The seal of FIG. 1 illustrated is of a one-piece structure — e.g. of steel, whose thickness will vary as described hereinbefore. The seal device as shown in FIG. 1 is adapted to be used in conjunction with a connecting member, such as a screw as shown in FIGS. 2 and 4. The screw includes a threaded shank portion 40 and a head 42, the latter including an inwardly stepped shoulder indicated generally by reference numeral 44, and a slot 45 to permit it to be threaded using e.g. a screw driver. The shoulder 44 has a first upper bearing surface 46, and a lower bearing surface 48. In use the screw may be threadably engaged with an object, such as a hydro meter, and threaded completely into a mating threaded aperture whereby the bearing surface 48 is flush with the surface of the object as for example illustrated in FIG. 6 (as will be hereinafter described). When mounted on the screw, the neck portion 30 of the depending skirt 28 is in juxtaposition with the bearing surface 46, as shown in FIG. 4, the depending skirt being deformed as shown in FIGS. 2 and 4 about the periphery of the head 42 of the screw.

Referring now to FIG. 5, there is illustrated a modified seal device according to the present invention, which includes a top cap indicated generally by reference numeral 60 having a top flat wall 62 with a continuous side wall 64 connected thereto. Extending outwardly from the side wall is a mating flange 66 about the periphery of the wall 64. The seal also includes a further flange 68 connected to a downwardly and inwardly extending peripheral skirt 70 and terminating in a free neck portion 72, the latter extending substantially in the axial direction of the seal. As in the previous embodiment, the neck outlines an access opening indicated generally by reference numeral 32 to permit the head of a connecting device to be placed in the cavity 24 defined by the top cap portion. This modified seal device of the present invention may be used in the same manner as the seal device described in the previous FIGS.

An apparatus or tool suitable for applying the seal device of the present invention to the connecting member is illustrated in FIG. 7, which may be made of, for example, metal and which includes a shank portion 50 terminating in a tapering bottom indicated generally by reference numeral 52. The terminal portion of the apparatus includes a shoulder indicated generally by reference numeral 54, which includes an inner cavity 58 with a stepped shoulder 60 forming a ledge surrounding a cavity. To apply a seal device to the connecting member, e.g. a screw, as for example illustrated in FIG. 6, the screw is normally threaded into sealing engagement with for example an object — a typical object being indicated by two layers 63 and 65 which are to be joined in engagement. The screw is threaded until the bearing surface 48 is flush with the surface of the object 63 and 65. A seal device may then be placed in the cavity 58 of the apparatus, and positioned over the head of the screw. The flange 26, resting on the shoulder 60 of the apparatus forms a pressure receiving surface and upon striking the apparatus, the depending skirt 28 and neck 30 are inwardly forced against the bearing surface 46 of the screw due to the neck portion 30 striking the surface of the object 63 and 65 whereupon it is deformed inwardly. Thus, in this manner, the neck 30 and part of the skirt 28 will then be brought into peripheral juxtaposition with the bearing surface 46 of the screw and will prevent access to the screw, without destruction or visible damage to the seal. In the embodiment shown, due to the concave configuration of the cavity 56, the tool will draw the top surface 20 of the cap into juxtaposition with the contours of the head 42 of the screw, at the same time thereby lowering the cap into close engagement with the surface of the head 42.

Should it be desired to remove the screw as in the case of repairs to an object, it will first be necessary to break the seal to insert suitable means into the slot 45 of the screw to remove it, e.g. a screw driver, and thus gain access.

It will be appreciated that various changes can be made to the above-described preferred embodiments of the present invention without departing from the spirit and scope of the invention.

I claim:

1. A seal device adapted to prevent tampering with a connecting means, said seal device comprising a cap provided with a cavity therein adapted to limit access to the head of a connecting means, an outwardly extending peripheral flange surrounding said cap, said flange having a curved and tapered peripherally mounted deformable downwardly depending skirt connected thereto, said skirt having a terminal substantially cylindrical neck portion defining therebetween an access opening to said cavity, said skirt being convexly curved and inwardly tapered throughout its extent between the connection with said flange and said neck portion.

2. The product of claim 1, wherein said cap is a continuous closed cap.

3. The product of claim 1, wherein said skirt comprises a continuous one-piece wall extending about said flange.

4. The product of claim 1, said seal device comprising a one-piece unitary member having a cap body, said cap body including a continuous peripheral side wall integrally connected to a top wall, said walls defining therebetween said cavity adapted to receive the head of a connecting means and to prevent access to said head, said head adapted to pass through said access opening into said cavity.

5. The product of claim 4, wherein said cap is also deformable.

6. The product of claim 1, wherein said seal device comprises a separate cap portion having said cavity therein and a first peripherally extending flange, a separate body portion, said body portion having a second peripherally extending flange adapted to mate in sealing engagement with said first flange, and said peripherally downwardly depending deformable curved and tapered skirt connected to said second flange of said body portion, said skirt having said terminal substantially cylindrical neck portion defining therebetween said access opening to said cavity.

7. The product of claim 4 wherein said skirt is continuous.

* * * * *